ature of United States Patent [19]

Ozawa et al.

[11] 4,139,672
[45] Feb. 13, 1979

[54] PROCESS FOR FORMING A COATING HAVING A METALLIC FINISH

[75] Inventors: Hiroshi Ozawa; Yoshinori Torii, both of Yokohama; Yasuo Okita, Ohiso; Nobuki Kobayashi; Koji Ishikawa, both of Yokohama, all of Japan

[73] Assignee: Mitsui Toatsu Chemicals, Inc., Japan

[21] Appl. No.: 750,414

[22] Filed: Dec. 14, 1976

[30] Foreign Application Priority Data

Dec. 19, 1976 [JP] Japan .................... 51-150499

[51] Int. Cl.² .................. B32B 7/08; B05D 3/02
[52] U.S. Cl. ...................... 428/323; 427/27; 427/195; 427/202; 427/375; 427/407 R; 427/409; 428/328; 428/461; 428/514; 428/520
[58] Field of Search .......... 427/27, 195, 407 R, 427/409, 375, 202; 428/461, 500, 515, 323, 328, 520, 461, 514

[56] References Cited

U.S. PATENT DOCUMENTS

| 2,823,140 | 2/1958 | Lowell | 428/461 X |
|---|---|---|---|
| 2,878,141 | 3/1959 | Canniff | 427/409 X |
| 3,677,792 | 7/1972 | Best | 427/421 X |
| 3,719,517 | 3/1973 | Gladstone et al. | 427/385 R X |
| 3,919,345 | 11/1975 | Labana et al. | 427/27 |
| 3,925,507 | 12/1975 | Katsimbas | 427/195 X |
| 3,939,127 | 2/1976 | Labana et al. | 427/27 X |
| 3,953,643 | 4/1967 | Cheung | 427/407 R X |
| 3,975,456 | 8/1976 | Labana et al. | 427/27 X |
| 3,988,494 | 10/1976 | McAdow | 427/409 X |
| 3,998,716 | 12/1976 | Masar et al. | 427/27 |

Primary Examiner—Shrive P. Beck
Attorney, Agent, or Firm—Wenderoth, Lind & Ponack

[57] ABSTRACT

A process for forming a coating having a metallic finish, which comprises (I) coating an undercoat paint (A) by electrodeposition on an article to be coated, (II) coating a water-thinnable intermediate coat paint (B) containing metallic scales on the coated surface of the undercoat before the undercoat is baked, (III) baking the undercoat and the intermediate coat, (IV) coating a powdery top coat paint (C) on the baked surface of the intermediate coat, and then (V) baking the top coat, said intermediate coat paint (B) containing a solid resin component at least 60% by weight of the entire resin solids which consists of a (meth)acrylate ester copolymer containing at least 0.1 equivalent, per 1,000 g of the solids content of the copolymer, of carboxyl or carboxyl ion groups and having a number average molecular weight of at least 3,000, and said top coat paint (C) containing a (meth)acrylate ester copolymer containing a glycidyl or β-methlglycidyl group and a polycarboxylic acid.

10 Claims, No Drawings

PROCESS FOR FORMING A COATING HAVING A METALLIC FINISH

This invention relates to a process for forming a coating having a metallic finish frequently used, for example, in painting automotive bodies. More specifically, the invention relates to a process for forming a coating having a metallic finish by simple process steps at a reduced cost without causing air pollution, which coating has superior durability and vividness, is easy to repair, and retains superior adhesions between the undercoat and the intermediate coat and between the intermediate coat and the top coat.

In recent years, much importance has been attached in the paint industry to a control of air pollution caused by organic solvents such as hydrocarbons contained in paints, and investigations have been undertaken to develop water-borne paints or powdery paints as non-polluting paints. It is technically difficult in various respects, however, to form a coating having a metallic finish using a water-borne or powdery paint. For example, attempts to obtain a satisfactory coating with a metallic finish from the water-borne paint tend to result in coating defects such as the occurrence of pinholes or sagging upon evaporation of water, and this defect is outstanding especially when humidity is high in the environment in which coating is performed. Accordingly, extra treatments such as the repetition of humidity adjustment, coating, and baking are required, and the productivity is reduced markedly. On the other hand, when the powdery paint is used to form a coating having a metallic finish, metallic scales are oriented at random, and the appearance of the metallic-finish coating obtained differs from that obtained by using solvent-type paints. For this reason, such a coating cannot be repaired with conventional repairing paints (solvent-type air drying paints). What is worse, the powdery paint cannot be used for repair as it required a baking temperature of at least 100° C.

It is an object of this invention, therefore, to provide a novel method for forming a metallic-finish coating without causing air pollution during the coating operation, and which is free from the defects of the conventional methods described hereinabvoe.

Another object of this invention is to provide a method which shows a further improvement over the conventional methods described above, and which can afford a metallic-finish coating at a lower cost with a lesser baking energy (a lesser amount of heat consumed), which coating has superior durability and vividness, and retains superior adhesions between the undercoat and the intermediate coat and between the intermediate coat and the top coat.

Other objects of this invention will become apparent from the following description.

According to this invention, these objects can be achieved by a process for forming a coating having a metallic finish, which comprises (I) coating an undercoat paint (A) by electro-deposition on an article to be coated, (II) coating a water-thinnable intermediate coat paint (B) containing metallic scales on the coated surface of the undercoat before the undercoat is baked, (III) baking the undercoat and the intermediate coat, (IV) coating a powdery top coat paint (C) on the baked surface of the intermediate coat, and then (V) baking the top coat, said intermediate coat paint (B) containing a solid resin component, at least 60% by weight of the entire resin solids in the intermediate coat consisting of a (meth)acrylate ester copolymer containing at least 0.1 equivalent, per 1000g of the solids content of the copolymer of carboxyl or carboxyl ion groups and having a number average molecular weight of at least 3,000, and said top coat paint (C) containing a (meth)acrylate ester copolymer containing a glycidyl or $\beta$-methyl glycidyl group and a polycarboxylic acid.

Whilst the conventional coating method requires three baking steps, the process of this invention can afford a coating by two bakings. Furthermore, since the amount of organic solvent discharged is relatively small, the occurrence of air pollution in the coating step can be avoided.

The undercoat paint (A) to be applied by electrodeposition in the process of this invention is of a known type, and includes paints heretofore used as primers for painting automobiles which consist of, as a main ingredient, a resin containing within the molecule carboxyl groups dissociable in aqueous solution, such as a maleinized oil, a water-soluble alkyd resin, maleinized polybutadiene, a maleinized petroleum resin, a water-soluble acrylic resin, or resins obtained by modifying the above resins with an epoxy, phenolic or melamine resin, and a filler such as titanium oxide, iron oxide, carbon black, zinc chromate, strontium chromate, calcium chromate, zinc oxide, and lead chromate. The undercoat formed by coating the undercoat paint on an article by electrodeposition and insolubilizing it desirably has a thickness of usually 10 to 25 microns.

In the conventional coating process, the electrodeposited undercoat is immediately baked, but in the process of this invention, it is not baked, but the intermediate coat paint (B) is coated thereon as soon as the undercoat is formed. Such a coating process has an especially great significance in practical operations in respect of the following. According to the conventional coating process, the undercoat applied by electrodeposition is baked, and then an organic solvent-based intermediate coat paint is coated on the hardened undercoat. If the intermediate coat paint is applied without baking the undercoat, coating defects such as craters and dents will occur frequently, and it will be difficult to form a serviceable coating. In contrast, when the undercoat paint (A) and the intermediate coat paint (B) are used in accordance with this invention, such coating defects do not occur even when the baking of the undercoat is omitted. Furthermore, in spite of the omission of the step of baking the undrrcoat (A), there is no mixing between the undercoat and the intermediate coat, and metallic scales contained in the intermediate coat paint (B) are uniformly oriented on the interface between the undercoat layer and the intermediate coat layer. This results in a coating having an appearance with good vividness, and since the baking of the two coated layers is performed at a time, the coating process can be simplified, and the energy required can be reduced.

The (meth)acrylate ester copolymer, a main ingredient of the intermediate coat paint (B) used in this invention, contains at least 0.1 equivalent, per 100 g of the resin solids, of a carboxyl or carboxyl ion group, and has a number average molecular weight of at least 3,000. Examples of the (meth)acrylate ester copolymer are copolymers formed between (1) at least one (meth)acrylate ester monomer such as methyl methacrylate, ethyl methacrylate, propyl methacrylate, n-butyl methacrylate, i-butyl methacrylate, 2-ethylhexyl methacrylate, laurylmethacrylate, tridecyl methacrylate, stearyl methacrylate, oleyl methacrylate, cyclohexyl methacrylate, tetrahydrofurfuryl methacrylate, glycidyl methacrylate, β-methylglycidyl methacrylate, hydroxyethyl methacrylate, hydroxypropyl methacrulate, hydrobutyl methacrylate, polypropylene oxide methacrylate, methyl acrylate, ethyl acrylate, propyl acrylate, n-butyl acrylate, i-butyl acrylate, 2- ethylhexyl acrylate, stearyl acrylate, oleyl acrylate, cyclohexyl acrylate, glycidyl acrylate, β-methylglycidyl acrylate, hydroxyethyl acrylate, hydroxypropyl acrylate, hydroxybutyl acrylate, polyethylene oxide acrylate, and polypropylene oxide acrylate and (2) at least one unsaturated carboxylic acid or its anhydride such as acrylic acid, methacrylic acid, maleic anhydride, fumaric acid, itaconic acid, and crotonic acid; and copolymers prepared from (1) (meth)acrylate ester monomer described above, (2) the unsaturated carboxylic acid or irs anhydride described above, and (3) a copolymerizable vinyl monomer such as styrene, vinyl toluene, α-methyl styrene, acrylonitrile, methacrylonitrile, acrylamide, methacrylamide, methylol acrylamide, alkoxy methylol acrylamide, vinyl acetate, vinyl propionate, and versatic acid vinyl esters.

The (meth)acrylate ester copolymers exemplified above can be prepared easily by known polymerizing methods such as solution polymerization, bulk polymerization or emulsion polymerization. The product can be used as the intermediate coat paint (B) in this invention after, if desired, rendering it water-thinnable by adding ammonia or amines such as trimethylamine, triethylamine triethanolamine, dimethylethanolamine, diethylethanolamine, triisopropanolamine, dimethylbenzylamine, dimethylisopropanolamine, or morpholine. In order that the (meth)acrylate ester copolymer used as the intermediate coat paint (B) in the process of this invention may be water-thinnable, it is necessary that the carboxyl or carboxyl ion groups ascribable to the unsaturated carboxylic acid copolymerized form a salt to render the resin water-soluble; or that the (meth)acrylate ester copolymer resin is present in the form of an aqueous emulsion containing finely divided particles of the resin with a particle size of, say, 0.01 to 0.5 micron; or that both of these conditions exist.

The carboxyl groups or carboxyl ion groups contained in an amount of at least 0.1 equivalent per 1,000g of the resin solids in the (meth)acrylate ester copolymer markedly increase the adhesions between the undercoat formed by the undercoat paint (A) and the intermediate coat, and between the top coat formed by the top coat paint (C) and the intermediate coat, and contribute to the formation of a coating having superior durability. If the content of the carboxyl or carboxyl ion groups is less than 0.1 equivalent per 1,000g of the resin solids, the adhesions between the undercoat and the intermediate coat and between the intermediate coat and the top coat are reduced unfavorably. The especially preferred content of the carboxyl or carboxlyl ion groups is 0.2 to 1.5 equivalents.

It is necessary that the (meth)acrylate ester copolymer resin used in this invention have a number average molecular weight of at least 3,000. If the number average molecular weight is less than 3,000, the intermediate coat paint mixes with the unbaked undercoat applied by electrodeposition, and therefore, a uniform orientation of metallic scales is impaired. As a result, it becomes impossible to form a metallic-finish coating which can be repaired by a solvent-based air drying paint. Especially preferably, the (meth)acrylate ester copolymer resin has a number average molecular weight of at least 8,000.

In order to conveniently use the (meth)acrylate ester copolymer resin having the number average molecular weight specified in this invention as the intermediate coat paint, it is desirable that the resin be present in the form of an emulsion in an aqueous medium.

When the amount of the (meth)acrylate ester copolymer resin is less than 60% by weight of the entire resin solids of the intermediate coat paint (B), the undercoat paint (A) mixes with the intermediate coat paint (B), and the metallic scales cannot be uniformly oriented, in which case it is difficult to form a metallic-finish coating that is easy to repair.

The metallic scales contained in the intermediate coat paint (B) are, for example, aluminum scales, bronze scales copper scales, and stainless steel scales. Of these, aluminum scales have the highest versatility, and are oriented in layers in that portion of the intermediate coat which is near the undercoat to impart a metallic finish having especially superior vividness. The scale-like metal is incorporated in an amount sufficient to hide the undercoat, usually in an amount of 5 to 20% by weight based on the total resin solids content of the intermediate coat paint (B). It is general practice to use a coloring pigment together with the intermediate coat paint (B) to obtain the desired color hue.

In preparing the ihtermediate coat paint (B), the (meth)acrylate ester copolymer resin may be used alone, or it is possible to incorporate a crosslinking component such as an alkoxy methylol melamine resin, a defoamer, a levelling agent, a plasticizer, an anticrater agent, and a water-soluble organic solvent. The coating of the intermediate coat layer is preferably controlled so that the thickness of the intermediate coat after baking becomes 15 to 30 microns.

The article coated with the undercoat paint (A) and the intermediate coat paint (C) containing metallic scales is then baked for 10 to 30 minutes in a dryer usually held at a temperature of 150° to 180° C. Thus, a metallic-finish coating can be formed in which the undercoat paint (A) does not mix with the intermediate coat paint (B) and the metallic scales are oriented uniformly. No pinhole or sagging occurs. The coating thus formed from the undercoat and the intermediate coat has insufficient durability and poor vividness. These defects can be removed markedly in accordance with this invention by coating the top coat paint (C) on the coating so obtained.

The top coat paint (C) is an acrylic powdery paint composed of a glycidyl- or β-methylglycidyl-containing (meth)acrylate ester copolymer resin and a polycarboxylic acid. Examples of the copolymer resin are acrylic copolymer resins obtained by copolymerizing (i) at least one glycidyl- or β-methylglycidyl-containing monomer such as glycidyl acrylate, glycidyl methacrylate, β-methylglycidyl acrylate, or β-methylglycidyl methacrylate with (ii) at least one (meth)acrylate ester monomer such as methyl methacrylate, ethyl methacrylate, propyl methacrylate, n-butyl methacrylate, i-butyl methcarylate, 2-ethylhexyl methacrylate, lauryl methacrylate, stearyl methacrylate, cyclohexyl methacrulate, hydroxyethyl methacrylate, hydroxypropyl methacrylate, hydroxypropyl methacrylate, hydroxybutyl methacrylate, methyl acrylate, ethyl acrylate, propyl acrylate, n-butyl acrylate, i-butyl acrylate, 2-ethylhexyl acrylate, cyclohexyl acrylate, hydroxyethyl acrylate, and hydroxypropyl acrylate; and acrylic copolymer resins obtained by copolymerizing (i) at least one glycidyl- or β-methylglycidyl-containing monomer exemplified above, (ii) at least one (meth)acrylate ester monomer exemplified above, and (iii) if necessary at least one copolymerizable vinyl monomer such as styrene, α-methylstyrene, vinyl toluene, acrylonitrile, methacrylonitrile, acrylamide, methacrylamide, vinyl acetate, vinyl propionate, versatic acid vinyl esters, methylol acrylamide, and alkoxymethylol amides.

The content of the glycidyl or β-methylglycidyl group in the (meth)acrylate ester copolymer resin in the acrylic powdery topcoat paint (C) is desirably 0.5 to 2.5 equivalents per 1,000 g of the copolymer resin. Preferably, the copolymer resin has a glass transition point of at least 20° C., and a number average molecular weight of 2,000 to 10,000.

The polycarboxylic acid in the acrylic powdery top coat paint (C) is a crosslinking component, and conveniently includes, for example, succinic acid, adipic acid, pimelic acid, sebacic acid, azelaic acid, 1,12-dodecanedioic acid, 1,13-tridecanedioic acid, 1,14-tetradecanedioic acid, 1,16-hexadecanedioic acid, 1,18-octadecanedioic acid, 1,20-eicosanedioic acid, 1,24-tetraacosanedioic acid, eicosadienedioic acid, phthalic acid, isophthalic acid, tetrahydrophthalic acid, hexahydrophthalic acid, 3,9-bis(2- carboxyethyl)-2,4,8,10-tetraoxa (5,5)undecane, polyamide or polyester resins containing at least 2 carboxyl groups per molecule, and acrylic resins containing at least 2 carboxyl groups per molecule.

Desireably, the amount of the polycarboxylic acid in the acrylic powdery top coat paint (C) is one sufficient to provide the glycidyl or β-methylglycidyl group of the (meth)acrylate ester copolymer resin with 0.5 to 1.5 equivalents, per equivalent of the glycidyl or β-methylglycidyl group, of carboxyl groups.

It is possible to incorporate into the top coat paint known additives, such as a coated surface-smoothing aid, a flowability adjusting aid, a plasticizer, or a coloring pigment which does not hide the metallic-finish layer. These additives can be incorporated usually by mixing in the molten or wet state. Generally, it is preferred that the acrylic powdery top coat paint be coated so that the coating thickness becomes at least 20 microns.

The preferred baking temperature for the top coat paint (C) is about 150° to 200° C. in order to impart durability and vividness of metallic finish to the coating.

The top coat so formed adheres firmly to the intermediate coat to increase the vividness and durability of the coating to a great extent.

According to the present invention, a metallic-finish coating which has superior durability and vividness, retains superior adhesions between the undercoat and the intermediate coat and between the top coat and the intermediate coat, and can be easily repaired by a repairing paint such as solvent-based air drying paints can be obtained by a simplified and rationalized process. Moreover, in the process of this invention, the amount of an organic solvent required can be markedly reduced, and therefore, the pollution of the working environment by the volatilization of the organic solvent can be avoided. Accordingly, the process of this invention has a very high utilitarian value.

The following non-limitative Examples illustrate the present invention specifically.

EXAMPLES (1) Coating of an undercoat paint:

"POWDER COAT" (a maleinized polybutadiene-type paint for use as a primer in electrodeposition, a trademark for a product of Nippon Paint Co., Ltd.) was diluted with deionized water to a concentration of 12% by weight, and the pH of the dilution was adjusted to 8.0 with dimethyl ethanolamine. The paint was then placed in an electrodeposition bath, and electrodeposition was performed for 2 minutes at 200 volts using a 0.8 mm thick steel sheet treated with iron phosphate as a cathode. The steel sheet was then washed with water to form a test sheet coated with an undercoat having a dry thickness of 15 to 17 microns.

(2) Preparation of an intermediate coat paint (B) and formation of an intermediate coat:

(2-1) To a copolymer resin derived from 30% by weight of methyl metahcrylate, 30% by weight of n-butyl acrylate, 15% by weight of hydroxyethyl methacrylate, 8% by weight of acrylic acid and 17% by weight of styrene, having a number average molecular weight of 4,200, and containing 1.1 equivalents, per 1,000 g of the resin solids, of carboxyl groups was added 0.8 equivalent, per equivalent of the carboxyl groups, of triethylamine, and the mixture was filuted with water to a concentration of 40% by weight, thereby to form an aqueous solution of the copolymer resin.

Separately, the above-mentioned monomeric mixture was emulsion-polymerized to afford an emulsion (resin solids 40% by weight) of a copolymer resin having a number average molecular weight of 25,000 and an average particle diameter of 0.12 micron and containing 1.1 equivalents, per 1,000 g of the resin solid, of carboxyl groups.

50 Parts by weight of the aqueous solution of the copolymer resin described above, 150 parts by weight of the copolymer resin emulsion, 20 parts by weight of a methylated methylol melamine resin (Cymel 350, a trademark for a product of American Cyanamid Co.) and 20 parts by weight of a 50% by weight butyl Cellosolve slurry of scale-like sluminum powders (Alpaste 1109 MA, a trademark for a product of Toyo Aluminum Co., Ltd.) were mixed with stirring, and then diluted with water. The mixture was spray-coated onto the undercoat of the test sheet obtained in (1) above, and baked at 170° C. for 20 minutes to form an intermediate coat having a thickness of 20 microns.

The proportion of the copolymer resin having a number average molecular weight of at least 3,000 and containing at least 0.1 equivalent, per 1,000 g of the resin solids of carboxyl groups was 80% by weight based on the entire resin solids content of the intermediate coat paint.

(2-2) A monomeric mixture consisting of 30% by weight of methyl methacrylate, 20% by weight of isobutyl acrylate, 20% by weight of glycidyl methacrylate, 10% by weight of hydroxypropyl methacrylate, 18% by weight of styrene and 2% by weight of acrylic acid was emulsion-polymerized to form an emulsion (the resin solids content 40% by weight) of a copolymer resin having a number average molecular weight of 18,000 and containing 0.27 equivalent, per 1,000 g of the resin solids, of carboxyl groups.

150 Parts by weight of the copolymer resin emulsion, 100 parts by weight of the copolymer resin emulsion (resin solids 40% by weight) described in paragraph (2-1) and 20 parts by weight of a 50% by weight butyl Cellosolve slurry of Alpaste 1109 MA were mixed with stirring, and diluted with water. The solution was spray-coated in the same way as in paragraph (2-1) above to form an intermediate coating after baking.

The resin components used in the intermediate coat paint were copolymers having a number average molecular weight of at least 3,000 and containing at least 0.1 equivalent, per 1,000 g of the resin solids content, of carboxyl groups.

(2-3) A monomeric mixture consisting of 50% by weight of methyl methacrylate, 42% by weight of n-butyl acrylate and 8% by weight of methacrylic acid was polymerized to form an acrylic hydrosol aqueous dispersion in which a copolymer resin having a number average molecular weight of 12,000 and an average particle diameter of 0.02 micron and containing 0.94 equivalent, per 1,000 g of the resin solids content, of carboxyl groups was dispersed in a concentration of 40% by weight in a mixture of water and ethyl Cellosolve (the water/ethyl cellsolve weight ratio being 7/3).

Separately, a monomeric mixture consisting of 60% by weight of ethyl methacrylate, 30% by weight of n-butyl acrylate, 2% by weight of acrylic acid and 8% by weight of methoxymethylol acrylamide was emulsion-polymerized to afford an emulsion (the solids content 40% by weight) of a copolymer resin having an average molecular weight of 25,000 and an average particle diameter of 0.21 micron and containing 0.28 equivalent, per 1,000 g of the resin solids content, of carboxyl groups.

200 Parts by weight of the copolymer resin emulsion, 50 parts by weight of the acrylic hydrosol aqueous dispersion and 20 parts by weight of a 50% by weight butyl Cellsolve slurry of Alpaste 1109 MA were mixed with stirring, and diluted with water. The mixture was spray-coated in the same way as in (2-1) above to form an intermediate coat after baking.

All of the resin components used in the intermediate coat paint were copolymer resins having a number average molecular weight of at least 3,000 and containing at least 0.1 equivalent, per 1,000 g of the resin solids content, of carboxyl groups.

(2-4) To a copolymer resin derived from 40% by weight of ethyl methacrylate, 30% by weight of isobutyl methacrylate, 15% by weight of vinyl toluene, 8% by weight of hydroxypropyl acrylate and 7% by weight of itaconic acid, having a number average molecular weight of 7,000 and containing 1.08 equivalents, per 1,000 g of the redin solids, of carboxyl groups was added 0.9 equivalent, per equivalent of the carboxyl groups, of morpholine, and the mixture was diluted with water to a concentration of 40% by weight to form an aqueous solution of the copolymer resin. 212.5 parts by weight of the aqueous solution of the copolymer resin obtained, 15 parts by weight of a methylated methylol melamine resin (Cymel 350, a trademark for a product of American Cyanamid Co.), and 20 parts by weight of a 50% by weight butyl Cellosove slurry of Alpaste 1109 MA (a trademark for a product of Toyo Aluminum Co.) were mixed with stirring, and diluted with water. The aqueous solution obtained was spray-coated on the same undercoat of the test plate or obtained in (1) above, and baked at 170° C. for 20 minutes to form an intermediate coat having a thickness of 20 microns.

The proportion of the copolymer resin having a number average molecular weight of at least 3,000 and containing at least 0.1 equivalent, per 1,000 g of the resin solids, of carboxyl groups was 85% based on the total resin solids content in the intermediate coat paint.

(2-5) 250 Parts by weight of an emulsion (solids content 40% by weight) in water of a copolymer resin derived from 30% by weight of ethyl methacrylate, 20% by weight of n-butyl methacrylate, 45% by weight of n-butyl acrylate, 2% by weight of hydroxyethyl methacrylate and 3% by weight of acrylic acid, having a number average molecular weight of 35,000 and an average particle diameter of 0.15 micron, and 0.42 equivalent, per 1,000 g of the resin solids content, of carboxlyl groups and 20 parts by weight of a 50% by weight butyl Cellosolve alurry of Alpaste 1109 MA were mixed with stirring, and diluted with water. The resulting mixture was spray-coated in the same way as in paragraph (2-1) above to form an intermediate coat after baking.

All of the resin components used in the intermediate coat paint were copolymer resins having a number average molecular weight of at least 3,000 and containing at least 0.1 equivalent, per 1,000 g of the resin solids, of carboxyl groups.

(3) Prepraraion of a top coat paint and formation of a top coat:

(3-1) 90 Parts by weight of a solid copolymer resin obtained by polymerizing a monomeric mixture consisting of 40% by weight of methyl methacrylate, 30% by weight of styrene, 5% by weight of hydroxyethyl acrylate, 20% by weight of glycidyl methacrylate and 5% by weight of butyl acrylate, 10 parts by weight of sebacic acid and 1 part by weight of Resimix L (a trademark for a product of Mohawk Ind., Ltd.) as a coated surface-smoothing aid were melt mixed by an extruder, cooled, and pulverized. Particles which passed through a 200-mesh screen were collected to form an acrylic powdery top coat paint.

The top coat paint so prepared was coated by an electrostatic powder spraying equipment on each of the intermediate coats formed in (2-1), (2-2) and (2-3) to a thickness of 30 to 35 microns, and baked at 170° C. for 20 minutes. Thus, test plates (I), (II) and (III) each having an undercoat, an intermediate coat and a top coat were prepared.

(3-2) 85 Parts by weight of a solid copolymer resin obtained by polymerizing a monomeric mixture consisting of 50% by weight of isobutyl methacrylate, 10% by weight of vinyl toluene, 10% by weight of cyclohexyl acrylate, 12% by weight of 2-ethylhexyl acrylate and 18% by weight of $\beta$-methylglycidyl methacrylate, 12 parts by weight of 1,20-eicosanedioic acid, 2 parts by weight of cyclohexanedicarbocylic acid, and 1 part by weight of Resimix L (a trademark for a product of Mohawk Ind., Ltd.) as a coated surface-smoothing aid were melt-mixed by an extruder, cooled, and pulverized. The particles were sieved by a 200-mesh screen to form an acrylic powdery top coat paint.

The resulting top coat paint was coated on each of the intermediate coats obtained in (2-1), (2-2) and (2-3), and baked in the same way as in (3-1) above. Thus, test plates (IV), (V) and (VI) having an undercoat, an intermediate coat and a top coat were obtained.

(3-3) 88 Parts by weight of a solid copolymer resin obtained by polymerizing a monomeric mixture consisting of 50% by weight of methyl methacrylate, 20% by weight of 2-ethylhexyl methacrylate, 10% by weight of t-butyl methacrylate, 10% by weight of glycidyl acrylate and 10% by weight of $\beta$-methylglycidyl methacrylate, 12 parts by weight of dodecanedioic acid and 1 part by weight of Resimix L (a trademark for a product of Mohawk Ind., Ltd.) were melt-mixed by an extruder, cooled, and pulverized. Particles which passed through a 200-mesh screen were collected to form an acrylic powdery top coat paint.

The top coat paint obtained was coated by an electrostatic powder spraying equipment on each of the intermediate coats formed in (2-4) and (2-5) above to a thickness of 30 to 35% microns, and baked at 170° C. for 20 minutes. Thus, test plates (VII) and (VIII) having an undercoat, an intermediate coat and a top coat were obtained.

(4) Formation of coatings as comparisons (4-1) A test plate consisting of an undercoat and an intermediate coat was prepared in the same way as set forth in (2-1) above. The test plate is designated (IX).

(4-2) An intermediate coat paint obtained in the same way as in (2-1) above except that the amount of the scale-like aluminum powder was reduced to half was coated on the undercoated test plate obtained by the method described in paragraph (1) above to a thickness of 35 to 45 microns after baking. The coat was baked in the same way as in (2-1) above to form a test plate (X).

(4-3) A top coat paint consisting of the same components as the intermediate coat paint used in (2-1) above except that it did not contain the scaly aluminum powder was coated on the test plate (IX) to a thickness of 30 to 35 microns after baking, and baked at 170° C. for 20 minutes. The resulting test plate is designated (XI).

(4-4) The test plate undercoated by the method described in (1) above was baked at 170° C. for 20 minutes. A mixture consisting of 100 parts by weight of the acrylic powder top coat paint described in (3-1) above and 5 parts by weight of a dry aluminum powder obtained by washing scaly aluminum powder (Alpaste 1108MA) with acetone, vacuumdrying it and passing it through a 200-mesh screen was coated on the hardened undercoat to a thickness of 45 to 50 mixrons after baking by the same method as set forth in (3-1) above, and then baked to form a test plate (XII).

(4-5) The test plate undercoated by the method described in (1) above was baked at 170° C. for 20 minutes. An organic solvent-soluble intermediate coat paint consisting mainly of an alkyd resin and a butylated melamine formaldehyde resin (the alkyd resin/butylated melamine formaldehyde resin ratio was 70/30 calculated as the solids content) was coated to a thickness of 40 microns after baking, and then baked at 140° C. for 20 minutes. Then, an organic solvent-soluble acrylic top coat paint consisting mainly of a hydroxyl-containing thermosetting acrylic resin and a butylated melamine formaldehyde resin (the weight ratio of the thermosetting acrylic resin/butylated melamine formaldehyde resin was 70/30 calculated as the solids content) and containing 5% by weight, based on the resin solids, of scaly aluminum powder (Alpaste 1109MA) was coated on the hardened coating to a thickness of 30 to 35 microns after baking, and then at 170° C. for 20 minutes to form a test plate (XIII).

(5) Evaluation of the test plates

The test plates (I) to (VIII) in accordance with this invention and the test plates (IX) to (XIII) as comparisons were evaluated for the items shown in the following tables. The results are tabulated below.

| Vividness (by visual evaluation) | |
|---|---|
| Test plate No. | Rvaluation |
| (I) | Good |
| (II) | Good |
| (III) | Good |
| (IV) | Good |
| (V) | Good |
| (VI) | Good |
| (VII) | Good |
| (VIII) | Good |
| (IX) | Extremely poor |
| (X) | Somewhat poor |
| (XI) | Somewhat poor |
| (XII) | Somewhat poor |
| (XIII) | Generally good |

| Appearance of coating (by visual evaluation) | |
|---|---|
| Test Plate No. | Evaluation |
| (I) | Good |
| (II) | Good |
| (III) | Good |
| (IV) | Good |
| (V) | Good |
| (VII) | Good |
| (VIII) | Good |
| (IX) | Projection of aluminum particles observed |
| (X) | Occurrence of pinholes and sagging |
| (XI) | Occurrence of pinholes |
| (XII) | Projection of aluminum particles observed |
| (XIII) | Generally good |

| Repairability (by visual observation*) | |
|---|---|
| Test plate No. | Evaluation |
| (I) | Good |
| (II) | Good |
| (III) | Good |
| (IV) | Good |
| (V) | Good |
| (VI) | Good |
| (VII) | Good |
| (VIII) | Good |
| (IX) | Poor |
| (X) | Somewhat poor |
| (XI) | Generally good |
| (XII) | Extremely poor |
| (XIII) | Good |

*Note
A half of the area of each test plate was coated with a solvent-based metallic finish repairing paint (an air drying paint obtained by mixing a thermo-plastic acrylic resin with a scaly aluminum powder (Alpaste 1109MA)), and dried at 80° C for 30 minutes. The repairability of the test plate was evaluated by seeing whether there was a difference in the oriented state between the coated area and the uncoated area. "Good" in the above evaluation means that the area coated with the repairing paint, when visually observed, does not present a metallic finish appearance different from that of the uncoated area; in other words, they are similar to each other in appearance to an extent satisfactory for practical purposes.

| Adhesion between layers (by crosscut tape peeling after immersing in warm water*) | |
|---|---|
| Test plate No. | Evaluation |
| (I) | No change |
| (II) | No change |
| (III) | No change |
| (IV) | No change |
| (V) | No change |
| (VI) | No change |
| (VII) | No change |
| (VIII) | No change |
| (IX) | Partial peeling occured between the intermediate coat and the undercoat |
| (X) | No change |
| (XI) | No change |
| (XII) | No change |
| (XIII) | Partial peeling occurred between the intermediate coat and the undercoat |

*Note
Each of the test plates was immersed in warm water at 40° C for 240 hours, and then crosscuts at intervals of 1 mm were provided on the coated film both lengthwise and crosswise using a microknife. A pressure-sensitive Cellophane tape was adhered to the cuts, and peeled. The state of the coated film at this time was observed.

| Durability (A) (by visual evaluation of the delamination of the coated film and the occurrence of rust*) | |
|---|---|
| Test plate No. | Evaluation |
| (I) | No change |
| (II) | No change |
| (III) | No change |
| (IV) | No change |
| (V) | No change |
| (VI) | No change |
| (VII) | No change |

-continued

| | |
|---|---|
| (VIII) | No change |
| (IX) | The coating mostly peeled, and rust occurred |
| (X) | The coating partly peeled, and rust occurred |
| (XI) | The coating partly peeled, and rust occurred |
| (XII) | The coating partly peeled, and rust occurred |
| (XIII) | The coating partly peeled, and rust occurred |

*Note
10 Kg of silica sand was let fall onto each of the test plates from a height of 2 meters, and then the peeling of the coating was examined. Then, each of the test plates was placed in a salt spray tester for 240 hours, and then the occurrence of rust was examined.

Durability (B) (*)

| Test plate No. | Gloss retention (%) | Crosscut tape peeling |
|---|---|---|
| (I) | 85 | No change |
| (II) | 87 | No change |
| (III) | 84 | No change |
| (IV) | 88 | No change |
| (V) | 87 | No change |
| (VI) | 85 | No change |
| (VII) | 84 | No change |
| (VIII) | 87 | No change |
| (IX) | 65 | Partly peeled |
| (X) | 74 | Partly peeled |
| (XI) | 77 | Partly peeled |
| (XII) | 80 | Partly peeled |
| (XIII) | 78 | Partly peeled |

*Note
Each of the test plates was placed in a sunshine weather-ometer, and exposed for 1,000 hours. After the exposure, the gloss retention of each test plate was measured. Furthermore, crosscuts were provided at intervals of 1 mm on the exposed test plate both lengthwise and crosswise, and a pressure-sensitive Cellophane tape was adhered to the cuts. The tape was then removed, and the state of the coating at this time was observed.

Number baking steps

| Test plate No. | Evaluation |
|---|---|
| (I) | 2 |
| (II) | 2 |
| (III) | 2 |
| (IV) | 2 |
| (V) | 2 |
| (VI) | 2 |
| (VII) | 2 |
| (VIII) | 2 |
| (IX) | 1 |
| (X) | 2 |
| (XI) | 2 |
| (XII) | 2 |
| (XIII) | 3 |

Amount of organic solvent discharged (grams, when 1 m² of the coating was formed)

| Test plate No. | Evaluation |
|---|---|
| (I) | 14 |
| (II) | 11 |
| (III) | 15 |
| (IV) | 14 |
| (V) | 11 |
| (VI) | 15 |
| (VII) | 18 |
| (VIII) | 11 |
| (IX) | 14 |
| (X) | 25 |
| (XI) | 20 |
| (XII) | 3 |
| (XIII) | 180 |

What we claim is:

1. A process for forming a coating having a metallic-finish, which comprises the steps of:
   (I) applying an undercoat paint (A) by electrodeposition on an article to be coated;
   (II) applying a water-thinnable intermediate coat paint (B) containing metallic scales on the coated surface of the undercoat without first heating the undercoat, said water-thinnable intermediate coat paint being in the form of either an aqueous solution of salt of the resin in water, an emulsion of fine particles of the resin solids dispersed in water, or a system in which an aqueous solution and the emulsion exist together;
   (III) baking the undercoat and the intermediate coat;
   (IV) coating a powder top coat paint (C) on the baked surface of the intermediate coat, and then
   (V) baking the top coat, said intermediate coat paint (B) containing a solid resin component;
   at least 60% by weight of the entire resin solids consisting of a (meth)acrylate ester copolymer containing at least 0.1 equivalent, per 1,000 g of the solids content of the copolymer, of carboxyl or carboxyl ion groups and having a number average molecular weight of at least 3,000, and said top coat paint (C) containing a (meth)acrylate ester copolymer containing a glycidyl or β-methylglycidyl group and a polycarboxylic acid.

2. The process of claim 1 wherein the intermediate coat paint (B) contains a solid resin component, at least 60% by weight of the entire resin solids consisting of a (meth) acrylate ester copolymer containing 0.2 to 1.5 equivalents, per 1,000 g of the solids content of the copolymer, and having a number average molecular weight of at least 8,000.

3. The process of claim 2 wherein the intermediate coat paint (B) contains metallic scales in an amount of 5 to 20% by weight based on the total resin solids content.

4. The process of claim 1 wherein the resin contained in said intermediate coat (B) is provided in the form of a water soluble resin.

5. The process of claim 1 wherein the resin contained in said intermediate coat (B) is provided in the form of an aqueous emulsion with a particle size of 0.01 to 0.05 micron.

6. The process of claim 1 wherein the resin contained in said intermediate coat (B) is provided in the form of a mixture of a water-soluble resin and an aqueous emulsion with a particle size of 0.01 to 0.05 microns.

7. The process of claim 1 wherein the (meth)acrylate ester copolymer contained in the top coat paint (C) contains 0.5 to 2.5 equivalents, per 1,000 g thereof, of a glycidyl or β-methylglycidyl group.

8. The process of claim 1 wherein the (meth)acrylate ester copolymer contained in the top coat paint (C) has a transition point of at least 20° C., and a number average molecular weight of 2,000 to 10,000.

9. The process of claim 1 wherein the top coat paint (C) contains a (meth)acrylate ester copolymer containing a glycidyl or β-methylglycidyl group and a polycarboxylic acid in an amount sufficient to provide the glycidyl group or β-methylglycidyl group of the copolymer with 0.5 to 1.5 equivalents, per equivalent of the glycidyl or β-methylglycidyl group, of carboxyl groups.

10. An article, having a metallic-finish, produced by the process of claim 1.

* * * * *

UNITED STATES PATENT AND TRADEMARK OFFICE
CERTIFICATE OF CORRECTION

PATENT NO. : 4,139,672
DATED : February 13, 1979
INVENTOR(S) : Hiroshi Ozawa, Yoshinori Torii, Yasuo Okita, Nobuki Kobayashi and Koji Ishikawa It is certified that error appears in the above-identified patent and that said Letters Patent are hereby corrected as shown below:

Page 1, under "Foreign Application Priority Data", change "Dec. 19, 1976" to -- Dec. 19, 1975 --; and change "51-150499" to -- 50-150499 --.

*Signed and Sealed this*

*Nineteenth* Day of *June 1979*

[SEAL]

Attest:

RUTH C. MASON
*Attesting Officer*

DONALD W. BANNER
*Commissioner of Patents and Trademarks*